United States Patent
Tsviatkou et al.

(10) Patent No.: US 9,298,921 B2
(45) Date of Patent: Mar. 29, 2016

(54) METHODS FOR DETECTING MALICIOUS PROGRAMS USING A MULTILAYERED HEURISTICS APPROACH

(71) Applicant: Check Point Software Technologies Ltd., Tel Aviv (IL)

(72) Inventors: Siarhei Tsviatkou, Senica (BY); Siarhei Rabinin, Minsk (BY); Aliaksei Vavilau, Minsk (BY); Andrei Ryshkevich, Zhodino (BY)

(73) Assignee: CHECK POINT SOFTWARE TECHNOLOGIES LTD., Tel-Aviv (IL)

( * ) Notice: Subject to any disclaimer, the term of this patent is extended or adjusted under 35 U.S.C. 154(b) by 0 days.

(21) Appl. No.: 13/684,594

(22) Filed: Nov. 26, 2012

(65) Prior Publication Data

US 2013/0117853 A1     May 9, 2013

Related U.S. Application Data

(63) Continuation of application No. 12/690,121, filed on Jan. 20, 2010, now Pat. No. 8,370,934.

(60) Provisional application No. 61/220,218, filed on Jun. 25, 2009.

(51) Int. Cl.
    *G06F 21/00*     (2013.01)
    *G06F 21/56*     (2013.01)

(52) U.S. Cl.
    CPC ............ *G06F 21/563* (2013.01); *G06F 21/566* (2013.01)

(58) Field of Classification Search
    None
    See application file for complete search history.

(56) References Cited

U.S. PATENT DOCUMENTS

| | | | |
|---|---|---|---|
| 5,826,013 A * | 10/1998 | Nachenberg | 726/22 |
| 6,971,019 B1 | 11/2005 | Nachenberg | |
| 7,694,150 B1 * | 4/2010 | Kirby | 713/188 |
| 7,739,737 B2 * | 6/2010 | Christodorescu et al. | 726/24 |
| 7,870,612 B2 | 1/2011 | Liu | |
| 7,877,806 B2 | 1/2011 | Repasi et al. | |
| 7,925,888 B1 | 4/2011 | Nachenberg | |
| 7,954,090 B1 | 5/2011 | Qureshi et al. | |
| 8,001,595 B1 | 8/2011 | Spurlock et al. | |
| 8,065,664 B2 | 11/2011 | Burtscher | |
| 8,069,315 B2 | 11/2011 | Williams | |
| 8,079,085 B1 * | 12/2011 | Wu et al. | 726/24 |
| 2005/0223238 A1 | 10/2005 | Schmid et al. | |
| 2005/0240999 A1 | 10/2005 | Rubin et al. | |

OTHER PUBLICATIONS

Definition of "statement", Microsoft Computer Dictionary, 5$^{th}$ ed., 2002, Microsoft Press, p. 626.*
Xin Hu, Tzi-cker Chiueh, and Kang G. Shin. 2009. Large-scale malware indexing using function-call graphs. In Proceedings of the 16th ACM conference on Computer and communications security (CCS '09). ACM, New York, NY, USA, 611-620.*

(Continued)

*Primary Examiner* — Jeffery Williams
(74) *Attorney, Agent, or Firm* — Mark M. Friedman

(57) ABSTRACT

Three heuristic layers are used to determine whether suspicious code received at a port of a data processing device is malware. First, static analysis is applied to the suspicious code. If the suspicious code passes the static analysis, dissembling analysis is applied to the suspicious code. Preferably, if the suspicious code passes the dissembling analysis, dynamic analysis is applied to the suspicious code.

13 Claims, 4 Drawing Sheets

(56) References Cited

OTHER PUBLICATIONS

Mihai Christodorescu and Somesh Jha. 2003. Static analysis of executables to detect malicious patterns. In Proceedings of the 12th conference on USENIX Security Symposium—vol. 12 (SSYM'03), vol. 12. USENIX Association, Berkeley, CA, USA, 12-12.*

Younghee Park, Douglas Reeves, Vikram Mulukutla, and Balaji Sundaravel. 2010. Fast malware classification by automated behavioral graph matching. In Proceedings of the Sixth Annual Workshop on Cyber Security and Information Intelligence Research (CSIIRW '10), Frederick T. Sheldon, Stacy Prowell, Robert K. Abercrombie, and Axel Krings (Eds.). ACM, N.*

Domagoj Babić, Daniel Reynaud, and Dawn Song. 2011. Malware analysis with tree automata inference. In Proceedings of the 23rd international conference on Computer aided verification (CAV'11), Ganesh Gopalakrishnan and Shaz Qadeer (Eds.). Springer-Verlag, Berlin, Heidelberg, 116-131.*

Domagoj Babić, Daniel Reynaud, and Dawn Song. 2012. Recognizing malicious software behaviors with tree automata inference. Form. Methods Syst. Des. 41, 1 (Aug. 2012), 107-128.*

Mihai Christodorescu, Somesh Jha, and Christopher Kruegel. 2008. Mining specifications of malicious behavior. In Proceedings of the 1st India software engineering conference (ISEC '08). ACM, New York, NY, USA, 5-14.*

Mihai Christodorescu, Somesh Jha, Sanjit A. Seshia, Dawn Song, and Randal E. Bryant. 2005. Semantics-Aware Malware Detection. In Proceedings of the 2005 IEEE Symposium on Security and Privacy (SP '05). IEEE Computer Society, Washington, DC, USA, 32-46.*

J.Bergeron et al, "Static Detection of Malicious Code in Executable Programs"; LSFM Research Group, Depatement D'informatique, Universite' Laval. Canada.

Johannes Kinder, "Detecting malicious Code by Model Checking",in K. Julisch et al (Eds) : DIMVA 2005, LNCS 3549 ,pp. 174-187.

* cited by examiner

METHODS FOR DETECTING MALICIOUS PROGRAMS USING A MULTILAYERED HEURISTICS APPROACH

This is a continuation of U.S. patent application Ser. No. 12/690,121 filed Jan. 20, 2010, which is a continuation-in-part of U.S. Provisional Patent Application No. 61/220,218, filed Jun. 25, 2009

FIELD AND BACKGROUND OF THE INVENTION

The present invention relates to methods for detecting malicious programs using a multilayered heuristics approach.

The exposure of computer systems to malicious attacks threatens the integrity of secure data storage and transactions. Today's attacks have become very sophisticated. Industry-wide practice shows there is no single solution for detection of malicious programs. Many existing products use a heuristics approach, but all of them focus on a dedicated methodology (e.g. emulation, API hooking, or behavior monitoring).

It would be desirable to have methods for detecting malicious programs using a multilayered heuristics approach.

SUMMARY OF THE INVENTION

It is the purpose of the present invention to provide methods for detecting malicious programs using a multilayered heuristics approach.

A multilayered heuristics approach, among other things, consolidates several methods into a combined, complex solution. Every layer has its own strengths and limitations, but together they supplement each other, amplifying positive characteristics and reducing negative ones.

Embodiments of the present invention provide a multilayered heuristics approach using unique virtualization technology for behavior monitoring, and rely on a statistics-based approach that reflects current trends in malware.

Embodiments of the present invention protect against fresh, unknown, so-called "0-day" malicious programs. The layered components can be used separately in order to provide the best features required for the situation. The multilayered heuristics approach eliminates the necessity to release frequent updates, reducing support costs.

These and further embodiments will be apparent from the detailed description and examples that follow.

Therefore, according to the present invention there is provided a method of determining whether suspicious code received by a data processing device is malware, including the steps of (a) receiving the suspicious code at a port of the data processing device; and (b) applying static analysis to the suspicious code.

Also according to the present invention there is provided a data processing device including: (a) a port for receiving code; and (b) a module for determining whether the code is malware by steps including: (i) applying static analysis to the code, and (ii) if the code passes the static analysis, applying disassembling analysis to the code.

Also according to the present invention there is provided a computer readable storage medium having computer readable code embodied on the computer readable storage medium, the computer readable code for determining whether suspicious code received by a data processing device is malware, the computer readable code including: (a) program code for applying static analysis to the suspicious code; and (b) program code for: if the suspicious code passes the static analysis, applying disassembling analysis to the suspicious code.

The method of the present invention is a method for determining whether suspicious code received by a data processing device, such as a personal computer, a mobile device such as a smart phone, a firewall, a router, or an intrusion prevention/detection system, is malware. According to the basic method of the present invention, the suspicious code is received at a port of the data processing device. Static analysis is applied to the suspicious code. If the suspicious code passes the static analysis, i.e., if the suspicious code is not identified as malware by the static analysis, then disassembling analysis is applied to the suspicious code.

Preferably, if the suspicious code passes the disassembling analysis, i.e., if the suspicious code is not identified as malware by the disassembling analysis, then dynamic analysis is applied to the suspicious code. Most preferably, the dynamic analysis includes monitoring behavior of an execution of the suspicious code in a one-time isolated environment.

Preferably, the disassembling analysis includes the following steps. A set of a plurality of predicates is provided. Each predicate includes at least one API call. A plurality of nodes is identified in the suspicious code. The nodes are arranged in a tree. The tree is pruned so that every node includes at least two API calls. Then the tree is collapsed iteratively to a single node. In each iteration, each API call, of each leaf node of the tree, that is not an API call of one of the predicates, is moved to a parent node of the leaf node, and then the leaf nodes are removed. A list is accumulated of all the predicates whose API calls are encountered during the iterative collapsing of the tree. If, at the end of the collapsing of the tree, the list includes at least one such predicate (i.e., the list is not empty,) a set of one or more rules is matched to the list.

Most preferably, the pruning of the tree includes deleting from the tree all of the initial nodes of the tree and all the nodes of the tree that lack API calls, and then deleting from the tree every node that includes a single API call. The "initial" nodes of the tree are the nodes of the original tree (before the pruning) that lack a reference to some other node of the tree.

Also most preferably, the disassembling analysis also includes seeking encrypted code in the suspicious code if the pruning and the collapsing find fewer than a predetermined number of API calls.

The disassembling analysis rules may be unions (AND-logic relationships) of two or more predicates or intersections (OR-logic relationships) of two or more predicates.

Most preferably, the disassembling analysis also includes seeking one or more flexible signatures in the suspicious code.

The scope of the present invention also includes a data processing device in which the malware-detecting methodology of the present invention is implemented. The device includes a port for receiving code and a module (software and/or firmware and/or hardware) for applying the method of the present invention to the code. The scope of the present invention also includes a computer-readable storage medium bearing computer readable code for implementing the method of the present invention.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figure 1:
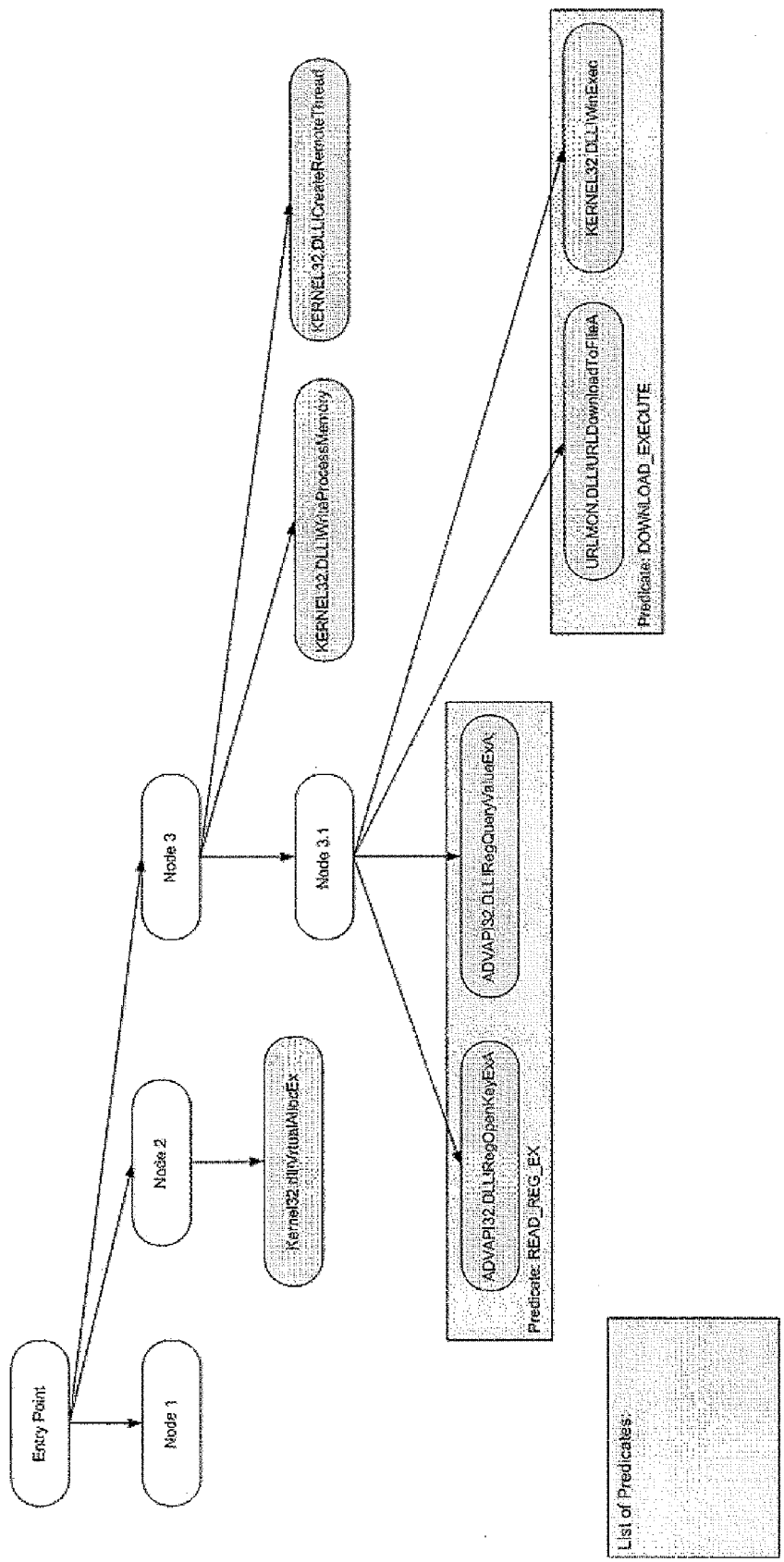
FIG. 1 is a simplified flowchart of the first iteration of a process for detecting malicious programs using the disassembling-analysis component, according to preferred embodiments of the present invention.

The principles and operation of the detection of malicious programs according to the present invention may be better understood with reference to the drawings and the accompanying description.

The present invention relates to methods for detecting malicious programs using a multilayered heuristics approach. The principles and operation for providing such methods, according to the present invention, may be better understood with reference to the accompanying description and the drawings.

The first layer in the multilayered heuristics approach is a static-analysis component. The static-analysis component analyzes programs based on their features. By features, it is meant program properties with specific values (e.g. size of file, imported functions, pieces of code). An aspect of the static-analysis component is reliance on combinations of features (or rules). Every feature by itself in most cases cannot be used for flagging a file as a malicious file, but a combination of features can be used effectively.

A set of rules is updated on a regular basis. New rules are generated automatically based on new features and the automated analysis of a stream of malicious programs. Analysis is based on a statistical approach, and is aimed to reflect current typical characteristics of malicious applications. Every rule is a combination of file features (e.g. file size, import-table content, strings found in file, and anomalies in file structure). Below is an example of a rule.

File size between 10000 and 100000 bytes;
File contains alphabet for base64 encoding;
Import table is present;
Import table is valid;
File contains virtual-machine (VM) detection signature.

The static-analysis component is limited by the packaging method of an application's binary code. If the binary code is packaged by any unsupported type of run-time packer, the static-analysis component will be unable to analyze such a program.

The second layer in the multilayered heuristics approach is a disassembling-analysis component. The disassembling-analysis component disassembles the code of a program, and searches for functional patterns. The disassembling-analysis component analyzes these patterns, and makes a decision whether such a program is malicious or not.

The disassembling-analysis component operates as follows. An executable file is divided into "nodes" starting from an entry point. Each node is, in general, equivalent to a function in the code. Every node is a piece of code that is referenced from other part(s) of code (e.g. calls, conditional jumps, and unconditional jumps (if they go to node boundaries)). Nodes can have API calls or calls to other nodes.

It is noted that, in preferred embodiments, the number of nodes is limited to 1,000 to avoid long delays. In practice, it has been determined that this is enough nodes to identify most malware code patterns. Furthermore, limiting the number of nodes helps to avoid scanning large encrypted code segments.

The nodes are arranged in a list, regardless of any call patterns, with each node containing a reference to its parent node (i.e. a node that calls it in the original program, or an arbitrary calling function if there are several). When creating this data structure we ensure that the parent-child relation generates a tree (i.e. a connected, cycle-free graph). Next, all nodes are rolled up into one node through an iterative process described below.

First, the disassembling-analysis component searches for nodes that do not contain any references to other nodes or API calls. Such nodes are simply removed, and references to these nodes are deleted.

Next, the disassembling-analysis component searches for nodes that have only one API call. Such nodes are also erased, and the API calls are raised into the parent node.

The following process happens iteratively, until one node remains. The disassembling-analysis component traverses the list of nodes, searching for nodes that do not have references to other nodes, but have more than one API call. The disassembling-analysis component tries to search for "predicates" in such nodes. Predicates are sets of functions.

An example of a 3-function predicate is:
"KERNEL32.DLL!FindFirstFileA;
KERNEL32.DLL!FindNextFileA;
KERNEL32.DLL!FindClose;"

A predicate matches the node if all the predicate's functions are present in a node. When a predicate matches any node, the predicate is marked as such. Finally, the disassembling-analysis component removes all predicate APIs from the node (if found), and transfers the rest of the APIs to the node's parent. Duplicate APIs are eliminated from the parent node, and the current node is deleted. It is noted that a predicate matches a node if all the predicate's functions appear in the node, regardless of the number of times or the order of their appearance in the node.

If a node does not match any predicate, then it is folded into its parent node as-is, i.e. all its API calls are copied into the parent, and the node is removed. Here again, duplicates are eliminated.

The disassembling-analysis component repeats these steps until there is only one node in the graph. This one node represents the program with all remaining, unmatched API calls. At this point, the engine applies the rules using the list of matched predicates, where a rule matches if all of its constituent predicates matched any node during the foregoing process. If any one of the rules matches, the file is flagged as malware.

Figure 2:
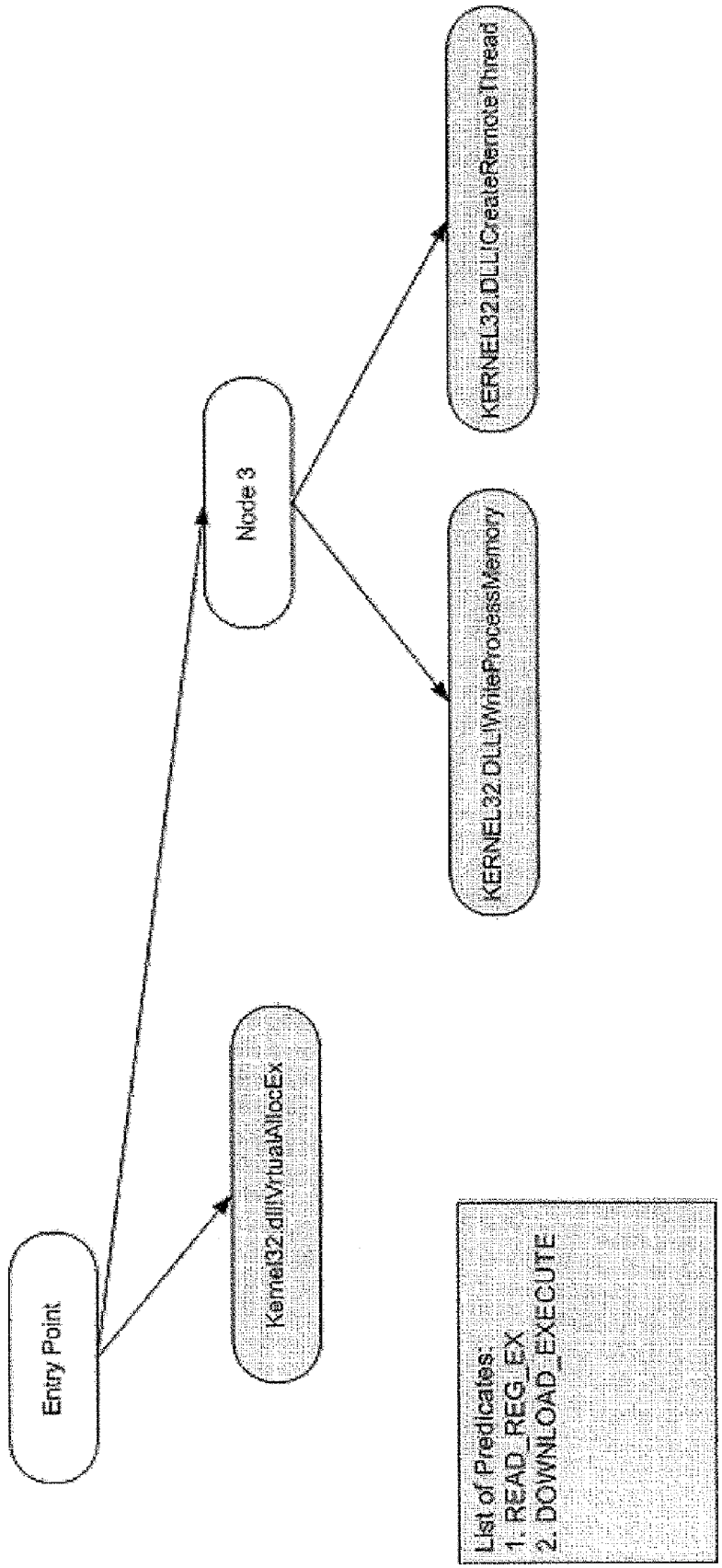
FIG. 2 is a simplified flowchart of the second iteration of the process of FIG. 1, according to preferred embodiments of the present invention.
Figure 3:
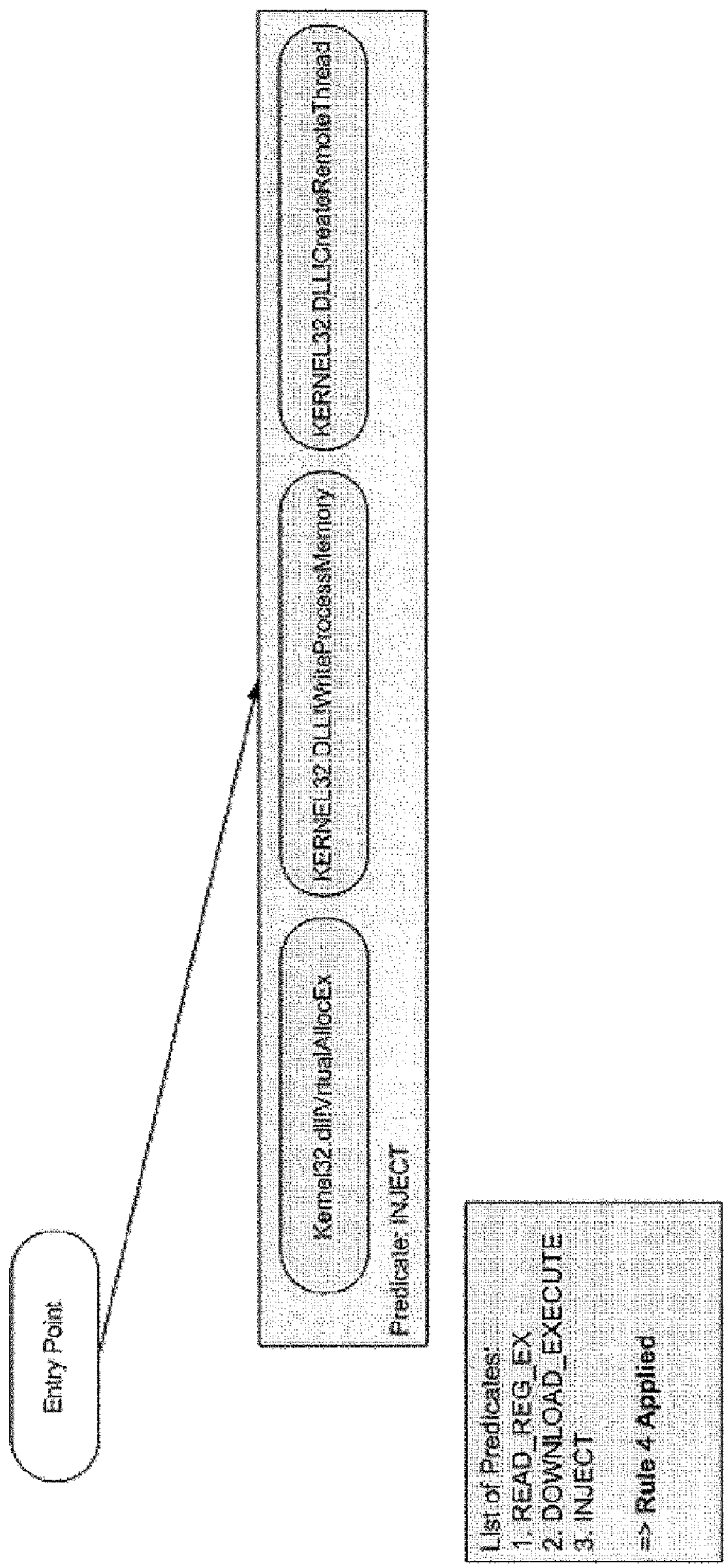
FIG. 3 is a simplified flowchart of the third and final iteration of the process of FIG. 1, according to preferred embodiments of the present invention.

Referring now to the drawings, FIG. 1 is a simplified flowchart of the first iteration of a process for detecting malicious programs using the disassembling-analysis component, according to preferred embodiments of the present invention. FIG. 2 is a simplified flowchart of the second iteration of the process of FIG. 1, according to preferred embodiments of the present invention. FIG. 3 is a simplified flowchart of the third and final iteration of the process of FIG. 1, according to preferred embodiments of the present invention.

The disassembling-analysis component includes two main parts: a code disassembly library and an analyzer. The analyzer uses two analysis methods: by API calls (as described above) and by "flexible" signatures (i.e. signatures that are not represented by byte sequences, but rather depend on operation codes (opcodes) and constants). It is helpful to ignore variable parameters (e.g. registers, addresses, and instruction succession) in program code. The disassembling-analysis component is able to detect some methods that malware often uses to detect the base address of the Windows "kernel32" DLL, encryption routines, manipulations of PEB (i.e. Process Environment Block, a Microsoft Windows structure), and control registers in a flexible way. Rules for disassembling-analysis component are based on a manual analysis of new malicious samples. An example of a rule that is used to detect malicious program for FIGS. 1-3

[Rule=4]
Definition=READ_REG_EX;DOWNLOAD_EXECUTE;INJECT;

There are three predicates in this example. All three must match in order for the rule to match. These predicates in turn are defined as follow:

[Predicate=1]
Name=INJECT
MainFunctions=
KERNEL32.DLL!VirtualAllocEx;
KERNEL32.DLL!WriteProcessMemory;
KERNEL32.DLL!CreateRemoteThread;
AdditionalFunctions=
KERNEL32.DLL!CreateProcessA;
KERNEL32.DLL!CreateProcessW;
KERNEL32.DLL!OpenProcess;
KERNEL32.DLL!CreateProcessAsUserA;
KERNEL32.DLL!CreateProcessAsUserW;
KERNEL32.DLL!GetStartupInfoA;
KERNEL32.DLL!GetStartupInfoRKERNEL32.DLL!SuspendThread;KERNEL32.DLL!ResumeThread;
KERNEL32.DLL!WaitForSingleObject;
KERNEL32.DLL!ReadProcessMemory;
KERNEL32.DLL!VirtualFree;
KERNEL32.DLL!CloseHandle;

It is noted that each predicate includes a list of "main functions" and "additional functions". When matching the predicate with a node, only the main functions must be present. But following a successful match, both the main functions and any of the additional functions are removed from the node.

[Predicate=15]
Name=READ_REG_EX
MainFunctions=
ADVAPI32.DLL!RegOpenKeyExA;
ADVAPI32.DLL!RegQueryValueExA;
AdditionalFunctions=ADVAPI32.DLL!RegCloseKey;

[Predicate=25]
Name=DOWNLOAD_EXECUTE
MainFunctions=
URLMON.DLL!URLDownloadToFileA;
SHELL32.DLL!ShellExecuteA;

A rule is a logical combination of predicates that represents behavior patterns. Typically, there is an assumed AND-logic relationship between predicates in a rule. However, it is often useful to have several predicates in an OR-logic relationship, and we denote such a group by using an identical name for all predicates. For example, the program can download a file using different methods (function sequences), but the result is the same. In order to allow for better flexibility, regardless of the method used, the predicate is called "DOWLOAD_FILE".

In cases where no API calls are found, or if their number is very small (e.g. less than 3) after unpacking the module, it is assumed that the program is packed with an unsupported packer, or it is encrypted. Therefore, a limited number of starting nodes are analyzed to detect encryption code, and flag the executable as malicious in case any are found.

The third layer in the multilayered heuristics approach is a dynamic-analysis component. The dynamic-analysis component runs an application in an isolated one-time environment, referred to as a Heuristics Virtualization Environment (HVE), and observes the application behavior (e.g. monitors Win32 API calls) in the HVE for a predefined amount of time (e.g. 2 minutes maximum). If the exposed behavior matches any rule for malicious behavior, then the given file is counted as malicious. The HVE is isolated from the host operating-system (OS), so all actions taken by an application inside the HVE do not affect the host OS and its running applications/data. Once analysis is completed, the HVE is removed, and nothing is left remaining on the system from the execution of the analyzed application.

Rules for the dynamic-analysis component are created manually based on analysis of the most-active malicious-program categories. Actions performed by malware are recorded during observation of malicious sample applications. Such actions are grouped into sequences, and the most typical ones are added into a heuristics rulebase.

The dynamic-analysis component is limited by the restrictions of virtualization. Initially targeted for browser applications, not any application downloaded by a user will be able to run properly in the HVE; thus, providing diagnosis for such an application may not be technically feasible. Another constraint is the awareness of malicious applications of various virtual/sandbox environments and avoidance of malicious actions when executed in such an environment as the HVE.

Every layer in the multilayered heuristics approach uses its own analysis technique that has a relatively low detection rate. Using each layer one-by-one allows the next layer to add value to the results of the previous layer by detecting missing applications. The common detection rate is the sum of rates of every component minus a very small overlap (e.g. <1%). To be marked as a "legitimate" program, an application must pass through all three heuristics layers. Once any component detects a malicious property or malicious activity, the program receives "malicious application" status.

Figure 4:
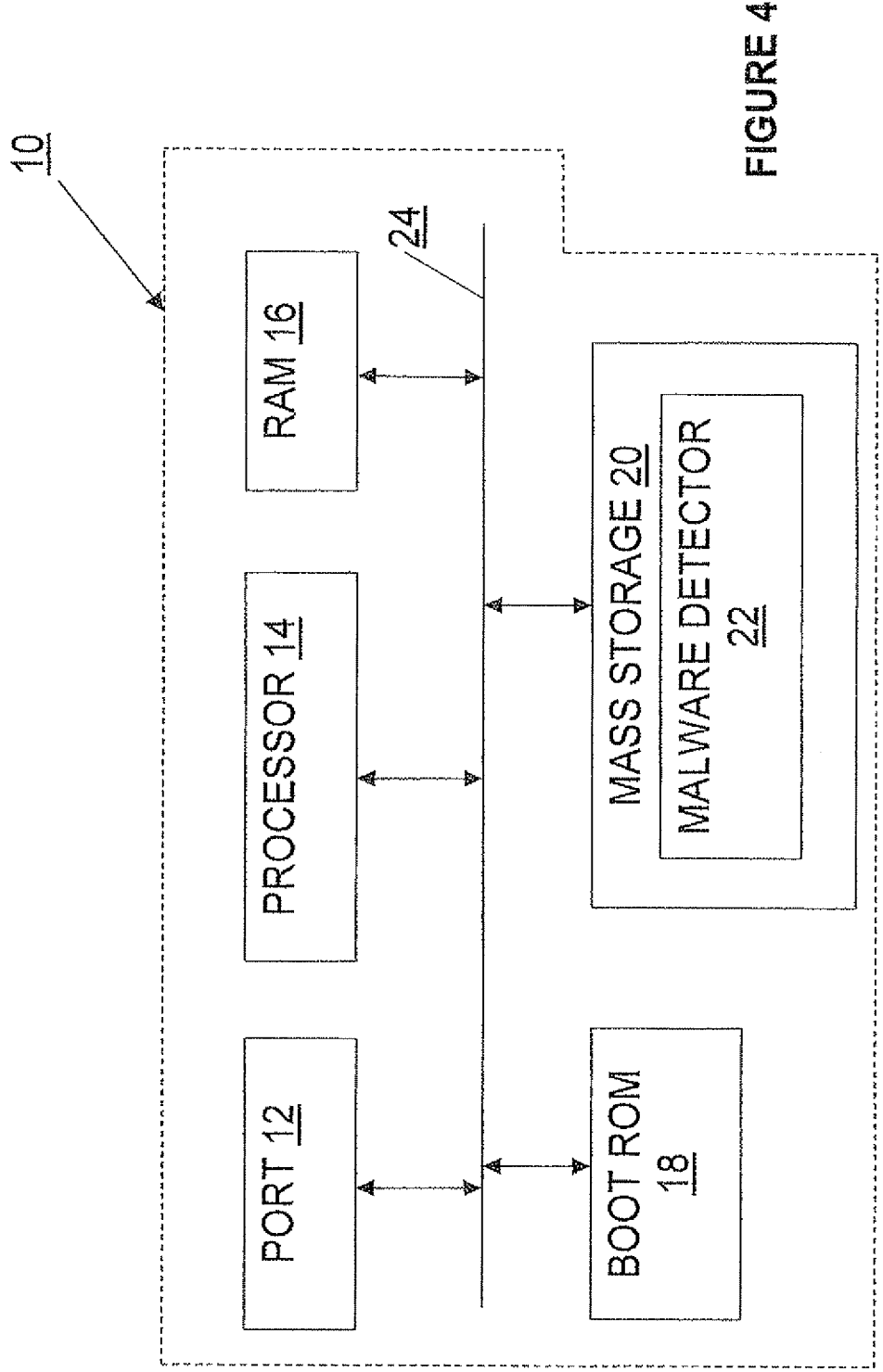
FIG. 4 is a high-level block diagram of a data processing device of the present invention.

The methods of the present invention are intended primarily for use in personal computers, but also are applicable to protecting data processing devices generally, including for example mobile devices such as smart phones, firewalls, routers and intrusion protection/detection systems, against malicious code. FIG. 4 is a high-level block diagram of such a data processing device 10. Note that only the components of data processing device 10 that are germane to the present invention are illustrated. So, for example, the user input/output devices, such as a keyboard, a mouse and a display screen, that normally would accompany device 10 if device 10 is a personal computer, are not illustrated. Device 10 includes a port 12 at which suspicious code is received, a processor 14 and several memories of which three are illustrated: a RAM 16, a boot ROM 18 and a mass storage device (hard disk) 20. Components 12, 14, 16, 18 and 20 communicate with each other via a common bus 24. A software module 22 of the present invention is stored, along with other software such as an operating system, in mass storage device 20. Under the control of the operating system, processor 14 copies the code of software module 22 to RAM 16 and executes the code of software module 22 to analyze suspicious code received at port 12 as described above.

Mass storage device 20 is an example of a computer-readable storage medium bearing computer-readable code for implementing the malware analysis methodology described herein. Other examples of such computer-readable storage media include read-only memories such as CDs that bear such code.

The device of FIG. 4 is an example of a software implementation of the present invention. As is known in the art, the firmware analysis methodology described herein can be implemented in software, in firmware, in hardware, and in combinations thereof.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method of determining whether suspicious code received by a data processing device is malware, comprising the steps of:
    (a) receiving the suspicious code at a port of the data processing device;
    (b) applying static analysis to the suspicious code;
    (c) determining that the suspicious code passes said static analysis; and
    (d) applying disassembling analysis to the suspicious code;
wherein said disassembling analysis is effected by steps including:
    (i) identifying a plurality of nodes in the suspicious code, each said node including functions from within the suspicious code;
    (ii) arranging said nodes in a tree in parent-child relationships, and;
    (iii) analyzing the functions in the nodes, and, based on the analysis, performing at least one of: 1) removing the node from the tree, or, 2) collapsing the node into its parent node.

2. The method of claim 1, further comprising the step of:
    (e) if the suspicious code passes said disassembling analysis, applying dynamic analysis to the suspicious code.

3. The method of claim 2, wherein said dynamic analysis includes monitoring behavior of an execution of the suspicious code in a one-time isolated environment.

4. The method of claim 1, wherein said disassembling analysis includes seeking at least one flexible signature in the suspicious code.

5. The method of claim 1, wherein said dissembling analysis is effected by steps further including:
    (iv) continuing to analyze the nodes until said tree is collapsed into a single node.

6. A data processing device comprising:
    (a) a port for receiving code; and
    (b) a module for determining whether said code is malware by steps including:
        (i) applying static analysis to the code, and
        (ii) if the code passes said static analysis, applying disassembling analysis to the code;
wherein said disassembling analysis is effected by steps including:
    (i) identifying a plurality of nodes in the suspicious code, each said node including functions from within the suspicious code;
    (ii) arranging said nodes in a tree in parent-child relationships, and;
    (iii) analyzing the functions in the nodes, and, based on the analysis, performing at least one of 1) removing the node from the tree, or, 2) collapsing the node into its parent node.

7. The data processing device of claim 6, wherein said module is implemented at least in part in hardware.

8. The data processing device of claim 6, wherein said module is implemented at least in part in firmware.

9. The data processing device of claim 6, wherein said module is implemented at least in part in software.

10. A non-transitory computer readable storage medium having computer readable code embodied on the computer readable storage medium, the computer readable code for determining whether suspicious code received by a data processing device is malware, the computer readable code comprising:
    (a) program code for applying static analysis to the suspicious code; and
    (b) program code for: if the suspicious code passes said static analysis, applying disassembling analysis to the suspicious code;
wherein said disassembling analysis is effected by steps including:
    (i) identifying a plurality of nodes in the suspicious code, each said node including functions from within the suspicious code;
    (ii) arranging said nodes in a tree in parent-child relationships, and;
    (iii) analyzing the functions in the nodes, and, based on the analysis, performing at least one of: 1) removing the node from the tree, or, 2) collapsing the node into its parent node.

11. The device of claim 6, wherein said disassembling analysis is effected by steps further including:
    (iv) continuing to analyze the nodes until said tree is collapsed into a single node.

12. The storage medium of claim 10, wherein said disassembling analysis is effected by steps further including:
    (iv) continuing to analyze the nodes until said tree is collapsed into a single node.

13. The method of claim 5, wherein the functions include: Application Programming Interface (API) Calls, sets including predicates, and combinations thereof.

* * * * *